(12) United States Patent
Nemoto et al.

(10) Patent No.: US 11,919,528 B2
(45) Date of Patent: Mar. 5, 2024

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Kazuki Nemoto, Susono (JP); Shin Tanaka, Numazu (JP); Satoshi Nakamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 17/538,077

(22) Filed: Nov. 30, 2021

(65) Prior Publication Data

US 2022/0219714 A1  Jul. 14, 2022

(30) Foreign Application Priority Data

Jan. 13, 2021 (JP) .................. 2021-003708

(51) Int. Cl.
| | |
|---|---|
| *B60W 50/029* | (2012.01) |
| *B60W 50/02* | (2012.01) |
| *H04W 4/46* | (2018.01) |
| *H04W 4/90* | (2018.01) |

(52) U.S. Cl.
CPC ...... *B60W 50/029* (2013.01); *B60W 50/0205* (2013.01); *H04W 4/46* (2018.02); *H04W 4/90* (2018.02); *B60W 2050/021* (2013.01); *B60W 2050/022* (2013.01); *B60W 2050/0292* (2013.01); *B60W 2556/65* (2020.02)

(58) Field of Classification Search
None
See application file for complete search history.

(56) References Cited

U.S. PATENT DOCUMENTS

| | | | | |
|---|---|---|---|---|
| 2016/0035222 | A1* | 2/2016 | Mikuni | G08G 1/0962 701/117 |
| 2020/0039508 | A1* | 2/2020 | Onishi | B60W 50/14 |
| 2022/0101726 | A1* | 3/2022 | Fields | G08G 1/0137 |

FOREIGN PATENT DOCUMENTS

| | | |
|---|---|---|
| JP | 2016-200986 A | 12/2016 |
| JP | 2019-087076 A | 6/2019 |

* cited by examiner

*Primary Examiner* — Shon G Foley
*Assistant Examiner* — Wenyuan Yang
(74) *Attorney, Agent, or Firm* — Dinsmore & Shohl LLP (57) ABSTRACT

A first vehicle includes a communication device configured to send and receive V2V information, a memory configured to store the V2V information, and a processor configured to perform abnormal traveling determination processing. A second vehicle includes a communication device configured to send and receive the V2V information, a memory configured to store the V2V information and driving environment information on the second vehicle, and a processor configured to perform objective determination processing. In the objective determination processing, whether the first vehicle is traveling abnormally is objectively determined based on the driving environment information on the second vehicle. The determination result of the objective determination processing is sent to the first vehicle. In the abnormal traveling determination processing, whether the first vehicle is traveling abnormally is determined based on this determination result. When the first vehicle is determined to be traveling abnormally, emergency vehicle control is performed for the first vehicle.

2 Claims, 8 Drawing Sheets

VEHICLE CONTROL SYSTEM AND VEHICLE CONTROL METHOD

CROSS-REFERENCE TO RELATED APPLICATION

This application claims priority to Japanese Patent Application No. 2021-003708 filed on Jan. 13, 2021, incorporated herein by reference in its entirety.

BACKGROUND

1. Technical Field

The present disclosure relates to a system and a method for improving the traveling safety of a first vehicle using communication between the first vehicle that is a host vehicle and a second vehicle that is another vehicle (vehicle-to-vehicle communication; hereinafter, also referred to as "V2V").

2. Description of Related Art

Japanese Unexamined Patent Application Publication No. 2019-87076 (JP 2019-87076 A) discloses a system that includes a plurality of vehicles traveling in a platoon and a server that communicates with these vehicles individually. The server of this conventional system detects an abnormal vehicle among the plurality of vehicles based on the behavior information on each vehicle. An abnormal vehicle is detected based on the statistical processing for the behavior information. When an abnormal vehicle is detected, the server identifies an abnormal portion based on the behavior information on the abnormal vehicle that is received from the normal vehicle traveling in front of or behind the abnormal vehicle. An abnormal portion may also be identified using V2V between the abnormal vehicle and the normal vehicle. When an abnormal portion is identified, the server provides the information on the abnormal portion to the abnormal vehicle or the normal vehicle.

SUMMARY

The information on the abnormal portion is information useful for the abnormal vehicle and the normal vehicle. However, though provided via the server in the conventional system, such information may be provided not via the server.

To provide such information not via the server, one possible way is to provide the information, useful for the first vehicle, using V2V performed between the first vehicle that is the host vehicle and the second vehicle that is another vehicle. In particular, since objective information as to whether the first vehicle is traveling abnormally is useful, it is desirable that such information be positively provided from the second vehicle to the first vehicle. However, there is no conventional technique developed from this point of view.

The present disclosure provides a new technique that makes it possible to improve the traveling safety of a first vehicle using V2V performed between the first vehicle that is the host vehicle and a second vehicle that is another vehicle.

A first disclosure is a vehicle control system that uses communication between a first vehicle and a second vehicle. The first disclosure has the following features. The first vehicle includes a communication device configured to send and receive vehicle-to-vehicle communication information, a memory configured to store the vehicle-to-vehicle communication information, and a processor configured to perform abnormal traveling determination processing for determining whether the first vehicle is travelling abnormally. The second vehicle includes a communication device configured to send and receive the vehicle-to-vehicle communication information, a memory configured to store the vehicle-to-vehicle communication information and driving environment information on the second vehicle, and a processor configured to perform objective determination processing for determining whether the first vehicle is traveling abnormally. The processor of the second vehicle is configured to determine, in the objective determination processing, whether the first vehicle is traveling abnormally based on the driving environment information on the second vehicle, to generate an objective determination result as the vehicle-to-vehicle communication information to be sent to the first vehicle, and to send the objective determination result to the communication device of the second vehicle. The objective determination result indicates the determination result of the objective determination processing. The processor of the first vehicle is configured to determine, in the abnormal traveling determination processing, whether the first vehicle is traveling abnormally based on the objective determination result and, when it is determined that the first vehicle is traveling abnormally, to perform emergency vehicle control for the first vehicle.

A second disclosure according to the first disclosure may further have the following features. The memory of the first vehicle may be configured to further store driving environment information on the first vehicle. The abnormal traveling determination processing may be configured to include subjective determination processing for subjectively determining whether the first vehicle is traveling abnormally. The processor of the first vehicle may be configured to determine, in the subjective determination processing, whether the first vehicle is traveling abnormally based on the driving environment information on the first vehicle. The processor of the first vehicle may be configured to comprehensively determine, in the abnormal traveling determination processing, whether the first vehicle is traveling abnormally based on the objective determination result and on a subjective determination result. The subjective determination result indicates the result of the subjective determination processing.

A third disclosure according to the second disclosure may further have the following features. The processor of the first vehicle may be configured to comprehensively determine, in the abnormal traveling determination processing, whether the first vehicle is traveling abnormally based on a calculation expression represented using the subjective determination result, the objective determination result, and weighting coefficients of the subjective determination result and the objective determination result. The weighting coefficients may be changed based on the driving environment information on the first vehicle.

A fourth disclosure is a vehicle control method that uses communication between a first vehicle and a second vehicle. The fourth disclosure has the following features. The vehicle control method includes, by a processor of the second vehicle, acquiring driving environment information on the second vehicle, performing objective determination processing for objectively determining whether the first vehicle is traveling abnormally based on the driving environment information, and sending an objective determination result to the first vehicle. The objective determination result indicates the result of the objective determination processing.

The vehicle control method further includes, by a processor of the first vehicle, receiving the objective determination result, determining whether the first vehicle is traveling abnormally based on the objective determination result, and performing emergency vehicle control for the first vehicle when it is determined that the first vehicle is traveling abnormally.

According to the first or fourth disclosure, the processor of the second vehicle performs the objective determination processing and sends the objective determination result to the first vehicle. Based on this objective determination result, the processor of the first vehicle determines whether the first vehicle is traveling abnormally. When it is determined that the first vehicle is traveling abnormally, the first vehicle performs the emergency vehicle control. Therefore, the first or fourth disclosure gives objectivity to the abnormal traveling determination of the first vehicle itself, making it possible to improve the traveling safety of the first vehicle.

According to the second disclosure, the processor of the first vehicle performs subjective determination processing and, based on this subjective determination result and on the objective determination result received from the second vehicle, comprehensively determines whether the first vehicle is traveling abnormally. Therefore, the second disclosure makes it possible to reflect the subjective determination result on the abnormal traveling determination of the first vehicle itself.

According to the third disclosure, the weighting coefficients of the subjective determination result and the objective determination result are changed based on the driving environment information on the first vehicle. The third disclosure allows the weighting coefficients to be changed in this way, making it possible to change the degree of reflection that the subjective determination result has on the abnormal traveling determination of the first vehicle itself.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle control system and a vehicle control method according to an embodiment of the present disclosure will be described below with reference to the drawings. The vehicle control method according to the embodiment is implemented by the computer processing performed in the vehicle control system according to the embodiment. Note that, in the figures, the same reference numerals will be given to the same or similar components and the description thereof will be simplified or omitted.

1. Outline of Embodiment 1-1. V2V

Figure 1:
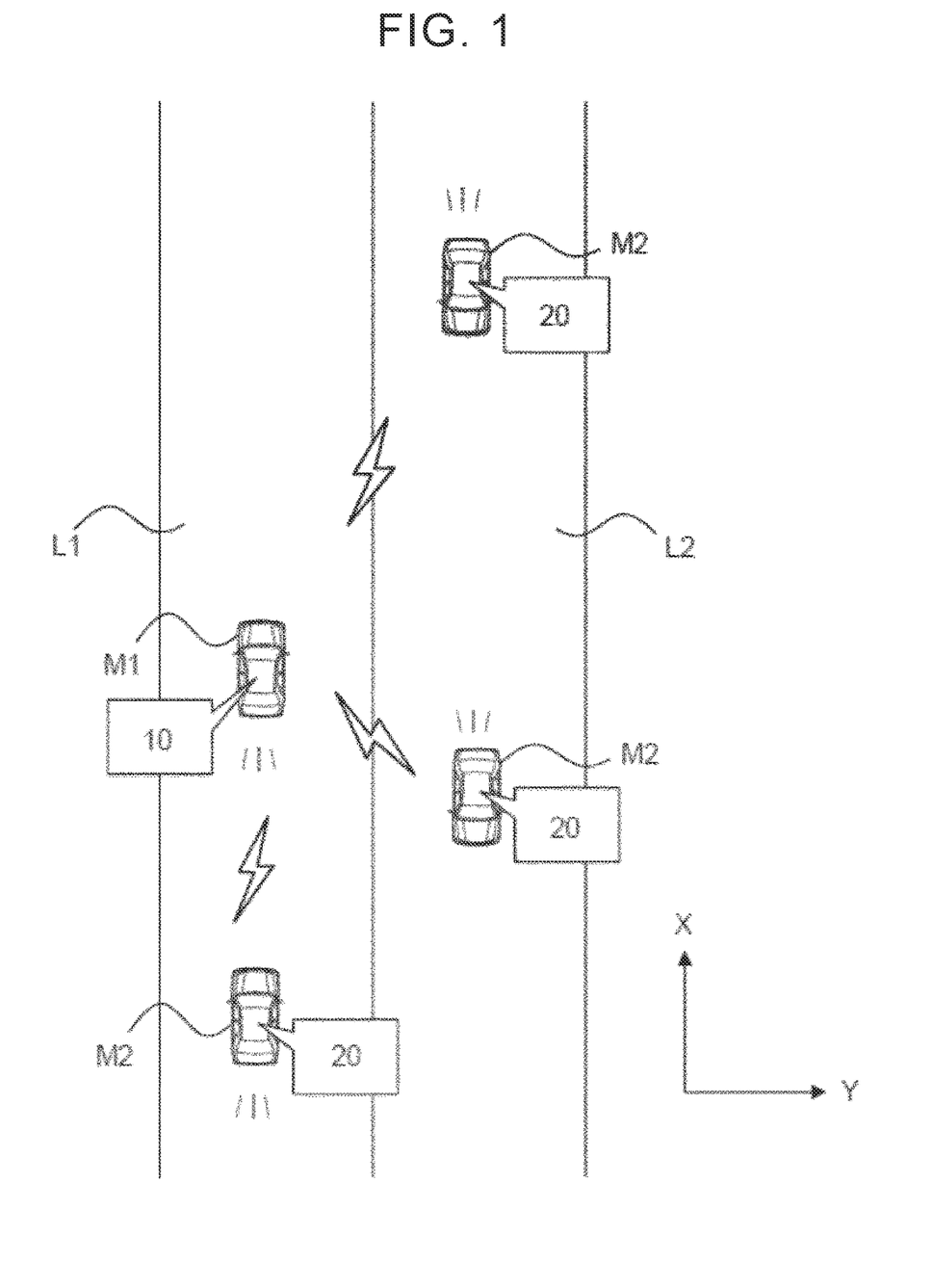
FIG. 1 is a diagram showing an example of V2V performed in a vehicle control system according to an embodiment.

FIG. 1 is a diagram showing an example of V2V performed in the embodiment. FIG. 1 shows a first vehicle M1 traveling in a lane L1. A plurality of second vehicles M2 is traveling around the first vehicle M1. One second vehicle M2 traveling in the lane L1 is a following vehicle traveling behind the first vehicle M1 in the same direction as the traveling direction of the first vehicle M1. Two second vehicles M2 traveling in a lane L2 are oncoming vehicles traveling in the direction opposite to the traveling direction of the first vehicle M1.

The X direction shown in FIG. 1 is the traveling direction of the first vehicle M1, and the Y direction is a plane direction orthogonal to the X direction. Note that the coordinate system (X, Y) is not limited to this example. The first vehicle M1 includes a control system 10. Each of the second vehicles M2 includes a control system 20. The control system 10 and the control systems 20 make up the vehicle control system according to the embodiment.

The control system 10 and each of the control systems 20 are configured to be able to communicate with each other. In the communication between the control system 10 and the control system 20, various types of V2V information are exchanged. Examples of the V2V information include the identification information (hereinafter, also referred to as "ID information") on the first vehicle M1 and the second vehicle M2. By receiving the ID information on the second vehicle M2, the first vehicle M1 recognizes the second vehicle M2 as a vehicle capable of V2V. By receiving the ID information on the first vehicle M1, the second vehicle M2 recognizes the first vehicle M1 as a vehicle capable of V2V.

The V2V information may include the driving situation information on the first vehicle M1 and the second vehicle M2. Examples of the driving situation information include the speed information, traveling direction information, and position information. The position information is composed, for example, of latitude and longitude information. For example, when the V2V information includes the driving situation information on the first vehicle M1 and when the second vehicle M2 has the map information, the second vehicle M2 uses this information to recognize the specific driving situation of the first vehicle M1. Examples of the specific driving situation include the lane in which the first vehicle M1 is currently traveling, the distance from the second vehicle M2 to the first vehicle M1, and the relative speed of the second vehicle M2 with respect to the first vehicle M1.

1-2. Abnormal Traveling Determination

Figure 2:
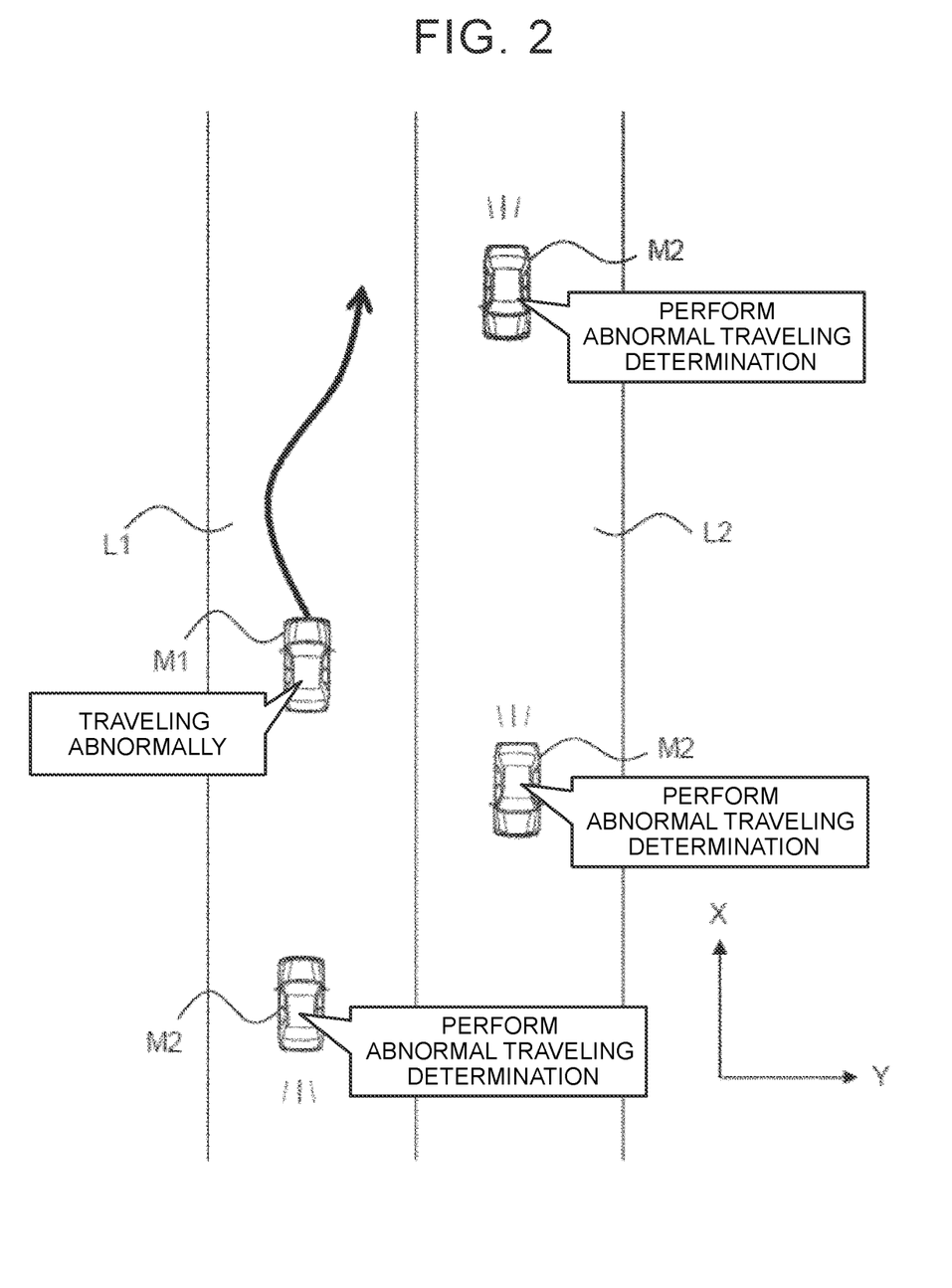
FIG. 2 is a diagram showing an application example of the embodiment.
Figure 3:
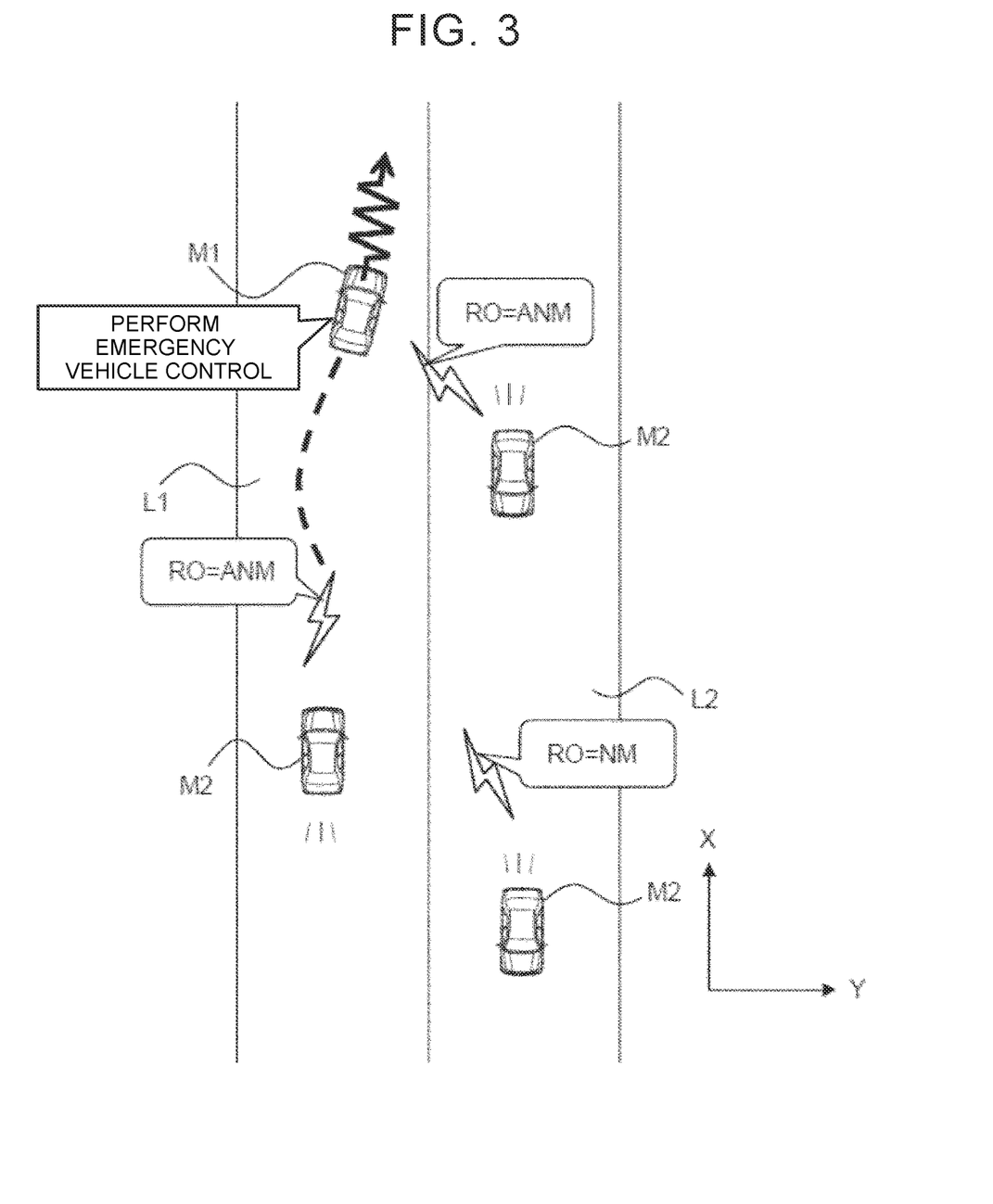
FIG. 3 is a diagram showing an application example of the embodiment.

FIG. 2 and FIG. 3 are diagrams showing an application example of the embodiment. The first vehicle M1 and the second vehicles M2 shown in FIG. 2 correspond to those shown in FIG. 1. FIG. 2 differs from FIG. 1 in that the traveling state of the first vehicle M1 shown in FIG. 2 is abnormal. The "abnormal traveling state" of the first vehicle M1 includes the traveling state in which the vehicle greatly exceeds the legal speed (speeding state), the traveling state in which the vehicle meanders across multiple lanes (meandering driving state), the traveling state in which the vehicle travels in the direction opposite to the traveling direction indicated by the lane (wrong-way driving state), and the traveling state in which the vehicle ignores the traffic light (red-light driving state).

The abnormal traveling state of the first vehicle M1 is detected by the abnormal traveling determination performed by the second vehicle M2 (control system 20). In the abnormal traveling determination, whether the traveling state of the first vehicle M1 is abnormal is determined based on the "driving environment information" on the second vehicle M2. The driving environment information on the second vehicle M2 includes the traveling situation information on the first vehicle M1 acquired by the external sensor (radar sensor, camera, etc.) provided in the control system 20. Therefore, with the use of the driving environment information on the second vehicle M2, whether the traveling state of the first vehicle M1 is abnormal is "objectively" determined. In the description below, the processing performed by the control system 20 to determine whether the first vehicle M1 is traveling abnormally is also referred to as "objective determination."

When the V2V information includes the driving situation information on the first vehicle M1, this driving situation information may be combined with the above-described traveling situation information, received from the external sensor, to make objective determination. When the second vehicle M2 includes the map information, this map information may be combined with the above-described traveling situation information on the first vehicle M1, received from the external sensor, to make objective determination. In this case, the map information on the second vehicle M2 is included in the driving environment information on the second vehicle M2.

As shown in FIG. 3, the result of each of the objective determinations (hereinafter, also referred to as "objective determination result") RO is provided to the first vehicle M1 via V2V. The objective determination result RO is, more specifically, a normality determination result NM or an abnormality determination result ANM. In the example shown in FIG. 3, the objective determination results ROs of two vehicles are each the abnormality determination result ANM, and the objective determination result RO of one vehicle is the normality determination result NM. These results are sent to the first vehicle M1 as the V2V information.

When the objective determination results ROs are received, the first vehicle M1 (control system 10) determines whether the first vehicle M1 itself is traveling abnormally based on the objective determination results ROs. This determination is made, for example, by determining whether the following expression (1) of the determination index Z is satisfied.

$$Z=\Sigma(1/Nro)Yi \geq TH1 \qquad (1)$$

In expression (1), Nro is the total number of received objective determination results Ros. The variable Yi ($1 \leq i \leq Nro$) is 0 for the normality determination result NM, and is 1 for the abnormality determination result ANM. The threshold value TH1 is a numerical value satisfying $0.5 \leq TH1 < 1.0$. The threshold value TH1 is set in advance.

When it is determined that expression (1) is satisfied, the control system 10 performs the emergency vehicle control for the first vehicle M1. By performing the emergency vehicle control, the abnormal traveling state of the first vehicle M1 is resolved.

Examples of the emergency vehicle control include deceleration traveling control and limp-home traveling control. In the deceleration traveling control, the control amount of the braking actuator of the first vehicle M1 is set, for example, so that the first vehicle M1 decelerates at the predetermined target deceleration (for example, −0.1 G). In the limp-home traveling control, the control amount of the steering actuator and the control amount of the braking actuator of the first vehicle M1 are set, for example, so that the first vehicle M1 stops on the shoulder of lane L1.

Figure 4:
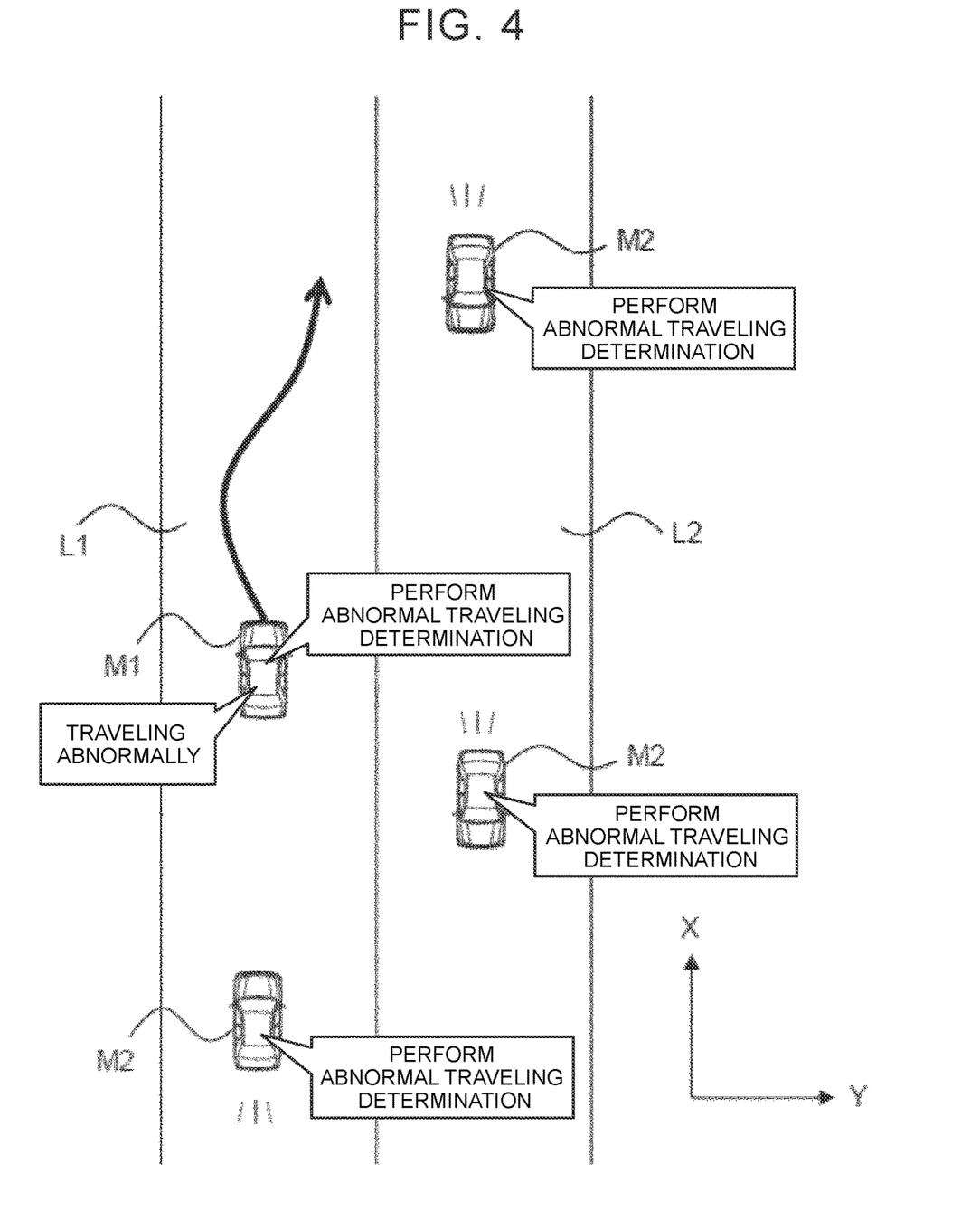
FIG. 4 is a diagram showing another application example of the embodiment.
Figure 5:
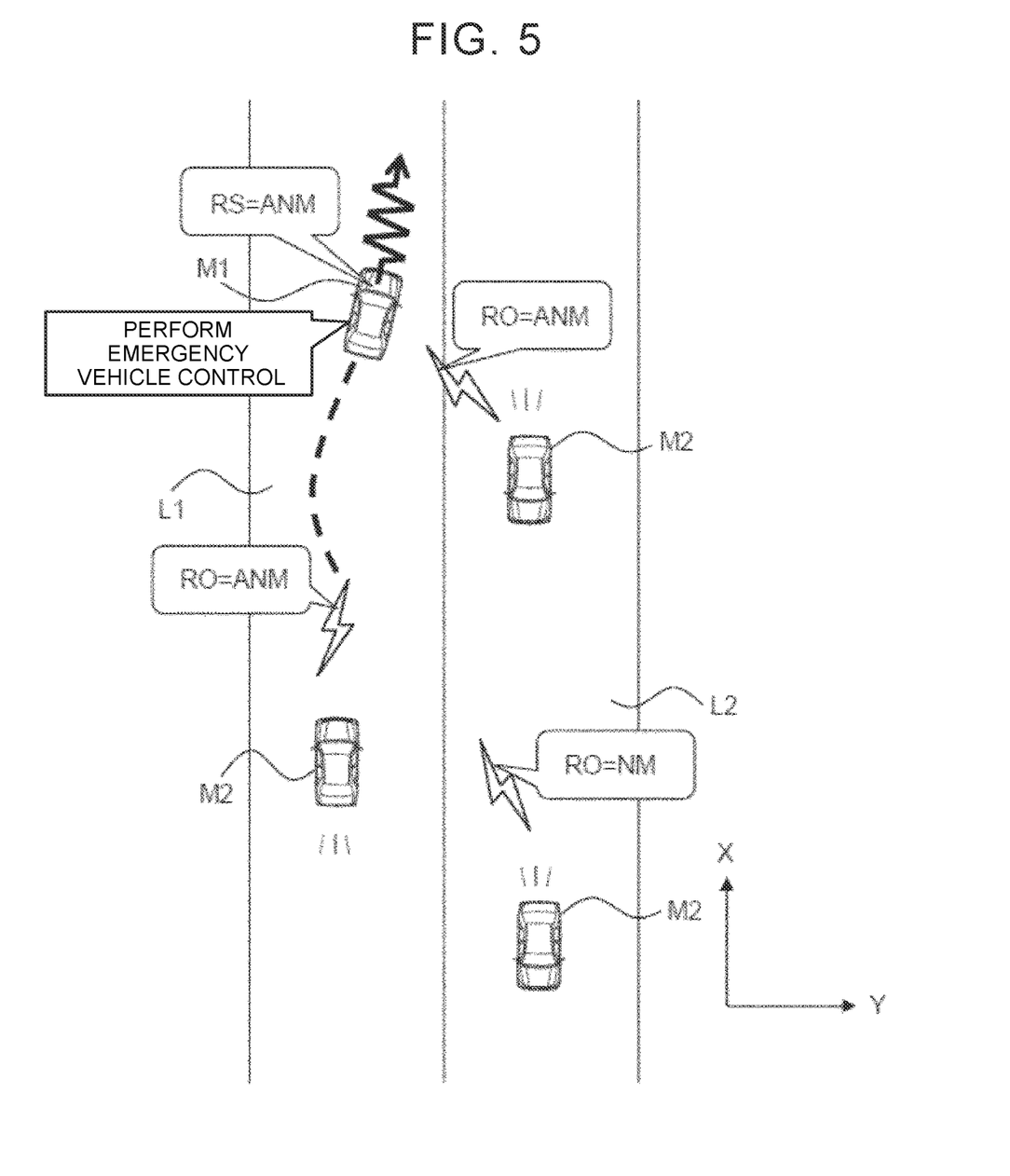
FIG. 5 is a diagram showing another application example of the embodiment.

FIG. 4 and FIG. 5 are diagrams showing another application example of the vehicle control system according to the embodiment. The premise of the example shown in FIG. 4 and that of the example shown in FIG. 2 are the same. FIG. 4 differs from FIG. 2 in that the first vehicle M1 shown in FIG. 4 determines whether its own traveling state is abnormal based on its own "driving environment information." The driving environment information on the first vehicle M1 includes the traveling situation information on the first vehicle M1 acquired by the external sensors (radar sensor, camera, etc.) provided in the control system 10. The driving environment information on the first vehicle M1 also includes the map information provided by the first vehicle M1.

When the driving environment information on the first vehicle M1 is used, whether the traveling state of the first vehicle M1 is abnormal is "subjectively" determined. In the description below, the determination as to whether the first vehicle M1 is traveling abnormally, performed by the control system 10, is referred also to as "subjective determination." The specific content of the result of the subjective determination RS (hereinafter, also referred to as "subjective determination result") is the same as that of the objective determination result RO.

In the example shown in FIG. 5, the subjective determination result RS is the abnormality determination result ANM. The first vehicle M1 (the control system 10), which receives the objective determination results ROs, "comprehensively" determines its own abnormal travelling based on the objective determination results ROs and the subjective determination result RS. This comprehensive determination is made, for example, by determining whether the following expression (2) of the determination index Z is satisfied.

$$Z=\alpha X + \beta \Sigma(1/Nro)Yi \geq TH2 \qquad (2)$$

In expression (2), the coefficients $\alpha$ and $\beta$ are weighting coefficients satisfying $\alpha + \beta = 1$. Each of these coefficients is set in advance. The variable X is 0 for the normality determination result NM, and is 1 for the abnormality determination result ANM. The threshold value TH2 is a numerical value satisfying $0.5 \leq TH2 < 1.0$. This threshold value is also set in advance. The description of Nro and the variable Yi is the same as that of expression (1).

When it is determined that expression (2) is satisfied, the control system 10 performs the emergency vehicle control for the first vehicle M1. Specific examples of the emergency vehicle control are the same as those in the example shown in FIG. 2 and FIG. 3.

In another example of comprehensive determination, the coefficients $\alpha$ and $\beta$ of expression (2) may be changed. For example, when the traveling situation information on the first vehicle M1 clearly indicates that the operating state of the drive actuator (more specifically, electric throttle) of the first vehicle M1 will continue to deviate significantly from the normal operating state, the coefficient $\alpha$ may be increased (i.e., the coefficient $\beta$ may be decreased).

In still another example of comprehensive determination, when the traveling situation information detected by the external sensor of the first vehicle M1 clearly indicates that the wrong-way driving state of the first vehicle M1 will continue, the coefficient α may be increased. When the coefficient α is increased, the degree of reflection is increased that the subjective determination result RS has on the abnormal traveling determination of the first vehicle M1 itself. Therefore, the emergency vehicle control can be performed more easily than before the coefficient α is increased.

According to the embodiment, each of the control systems 20 performs the objective determination and provides the objective determination result RO to the first vehicle M1 as described above. Then, based on these objective determination results ROs, the control system 10 determines whether the first vehicle M1 is traveling abnormally. When the control system 10 performs subjective determination, the control system 10 determines whether the first vehicle M1 is traveling abnormally based on the subjective determination result RS and the objective determination results ROs.

When it is determined that the first vehicle M1 is traveling abnormally, the control system 10 performs emergency vehicle control for the first vehicle M1. Therefore, the embodiment gives objectivity to the abnormal travelling determination of the first vehicle M1 itself, making it possible to improve the traveling safety of the first vehicle M1.

The vehicle control system and the vehicle control method according to the embodiment will be described below in detail.

Figure 6:
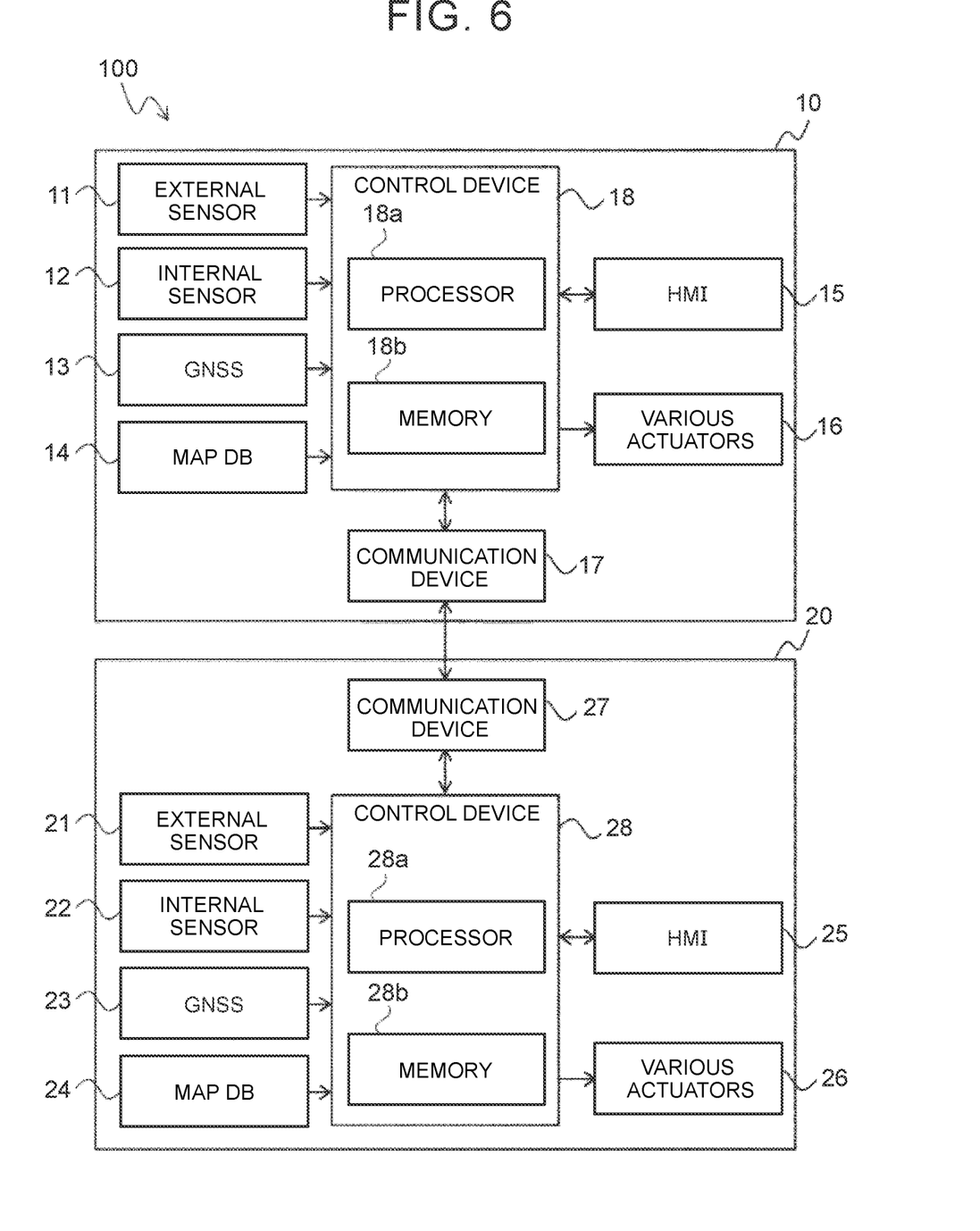
FIG. 6 is a block diagram showing an example of the configuration of the vehicle control system according to the embodiment.

2. Example of Configuration of Vehicle Control System
2-1. Example of Overall Configuration FIG. 6 is a block diagram showing an example of the configuration of the vehicle control system according to the embodiment. As shown in FIG. 6, the vehicle control system 100 includes the control system 10 and the control system 20. The control system 10 is a control system mounted on the first vehicle M1. The control system 20 is a control system mounted on the second vehicle M2.

The control system 10 includes an external sensor 11, an internal sensor 12, a Global Navigation Satellite System (GNSS) receiver 13, and a map database (map DB) 14. The control system 10 also includes a human machine interface (HMI) unit 15, various actuators 16, a communication device 17, and a control device 18.

The external sensor 11 is a device that detects the surroundings of the first vehicle M1. Examples of the external sensor 11 include a radar sensor and a camera. The radar sensor uses radio waves (e.g., millimeter waves) or light to detect targets around the first vehicle M1. Targets include static targets and dynamic targets. Examples of static targets include guardrails and buildings. Dynamic targets include pedestrians, bicycles, motorcycles, and vehicles other than the first vehicle M1. The camera captures the surroundings of the first vehicle M1.

The internal sensor 12 is a device that detects the traveling situation of the first vehicle M1. Examples of the internal sensor 12 include a vehicle speed sensor, an acceleration sensor, and a yaw rate sensor. The vehicle speed sensor detects the traveling speed of the first vehicle M1. The acceleration sensor detects the acceleration of the first vehicle M1. The yaw rate sensor detects the yaw rate around the vertical axis of the center of gravity of the first vehicle M1.

The GNSS receiver 13 is a device that receives signals from three or more artificial satellites. The GNSS receiver 13 is also a device that acquires the position information on the first vehicle M1. The GNSS receiver 13 calculates the position and attitude (direction) of the first vehicle M1 based on the received signals.

The map database 14 is a database that stores map information. Examples of the map information include the road position information, road shape information (for example, whether the road is curved or straight), and position information on intersections and structures. The map information also includes traffic regulation information. The map database 14 is formed in an in-vehicle storage device (for example, a hard disk or a flash memory). The map database 14 may be formed in a computer installed in a facility (for example, a management center) capable of communicating with the first vehicle M1.

The surroundings information acquired by the external sensor 11, the traveling situation information acquired by the internal sensor 12, the position and attitude information acquired by the GNSS receiver 13, and the map information are included in the "driving environment information" on the first vehicle M1.

The HMI unit 15 is an interface for providing information to the driver of the first vehicle M1 and for accepting information from this driver. The HMI unit 15 includes, for example, an input device, a display device, a speaker, and a microphone. Examples of the input device include a touch panel, a keyboard, a switch, and a button. The information provided to the driver includes the traveling situation information on the first vehicle M1 and the V2V information (e.g., ID information, traveling situation information). The information is provided to the driver using the display device and the speaker. The information is accepted from the driver using the input device and the microphone. Whether to accept the objective determination results ROs, received via V2V, is set by an acceptance operation through these devices.

The various actuators 16 are actuators included in the traveling device of the first vehicle M1. Examples of the various actuators 16 include a drive actuator, a braking actuator, and a steering actuator. The drive actuator drives the first vehicle M1. The braking actuator applies braking force to the first vehicle M1. The steering actuator steers the tires of the first vehicle M1.

The communication device 17 is provided with a sending antenna and a receiving antenna for wireless communication with the second vehicles M2 around the first vehicle M1. Wireless communication is performed using, for example, a directional beam composed of a narrow beam formed by a directional sending antenna. When performing V2V using a narrow beam, a synchronization system that performs beam matching using a pilot signal may be used. The frequency of wireless communication may be, for example, several hundred MHz lower than 1 GHz, or may be in a high frequency band equal to or higher than 1 GHz.

When performing V2V using a narrow beam, the beam may be synchronized using a pilot signal. For example, the first vehicle M1 sends a pilot signal to the surrounding vehicles, the surrounding vehicles detect the narrow-beam pilot signal in a wide beam mode or omnidirectional beam mode and, based on the detection result, the direction of the narrow beam of the surrounding vehicles is adjusted.

The control device 18 is configured by a microcomputer having at least one processor 18a and at least one memory 18b. At least one program is stored in the memory 18b. Various types of information including the V2V information and driving environment information are also stored in the memory 18b. A program is read from the memory 18b for execution by the processor 18a to implement various functions of the control device 18. The various functions include the above-described function to perform processing for determining whether the first vehicle M1 is traveling abnormally. This function also includes the function to perform emergency vehicle control using the various actuators 16.

The control system 20 includes an external sensor 21, an internal sensor 22, a GNSS receiver 23, and a map database 24. The control system 20 also includes an HMI unit 25, various actuators 26, a communication device 27, and a control device 28. The control device 28 includes at least one processor 28a and at least one memory 28b. In other words, the basic configuration of the control system 20 is the same as that of the control system 10. Therefore, for an example of the individual components of the control system 20, see the description of the control system 10.

The configuration of the control system 20 is not limited to the example shown in FIG. 6, and some components may be omitted. For example, the control system 20 does not have to include the GNSS receiver 23 and the map database 24.

2-2. Example of Processing Performed by Control System 20

Figure 7:
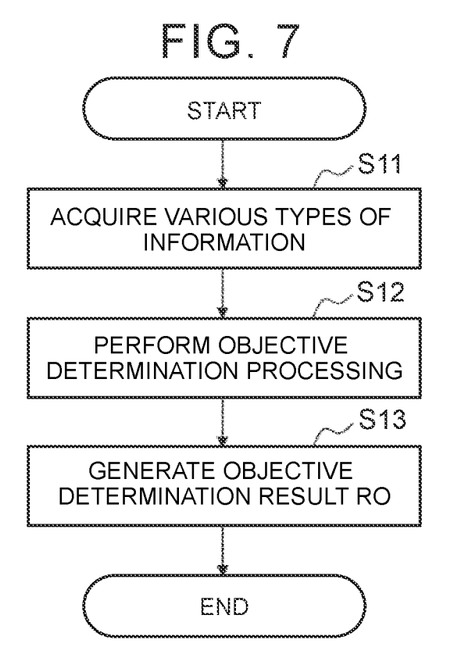
FIG. 7 is a flowchart showing the flow of a processing example performed by a control device (processor) of a second vehicle.

FIG. 7 is a flowchart showing the flow of an example of processing performed by the control device 28 (processor 28a). The routine shown in FIG. 7 is repeatedly performed in a predetermined control cycle.

In the routine shown in FIG. 7, various types of information are acquired first (step S11). Examples of the various types of information acquired in this step include the V2V information and the driving environment information. Examples of the V2V information include the ID information on the first vehicle M1. The V2V information may include the traveling situation information on the first vehicle M1. Examples of the driving environment information include the surroundings information from the external sensor 21, the traveling state information from the internal sensor 22, the position and attitude information on the second vehicle M2 acquired by the GNSS receiver 23, and the map information from the map database 24.

Following step S11, the objective determination processing is performed (step S12). The objective determination processing is performed based on the driving environment information acquired in step S11. For example, based on the surroundings information (road markings information) or the map information (legal speed information), the legal speed of the lane in which the first vehicle M1 is currently traveling is recognized. Then, based on the surroundings information, the traveling speed of the first vehicle M1 is calculated. After that, it is determined whether the calculated traveling speed greatly exceeds the legal speed. The result of this determination is used to determine whether the first vehicle M1 is in the speeding state.

In another example, the acceleration Ay of the first vehicle M1 in the lateral direction (Y direction) is calculated based on surroundings information (traveling situation information). After that, it is determined whether the acceleration Ay is increased or decreased repeatedly in a short period of time. The result of this determination is used to determine whether the first vehicle M1 is in the meandering driving state.

In yet another example, the lane in which the first vehicle M1 is currently traveling is recognized based on the surroundings information (traveling situation information) and the map information. After that, based on the surroundings information (traffic sign information attached to the lane in which the first vehicle M1 is currently traveling), it is determined whether the direction of traveling of the first vehicle M1 matches the direction indicated by the lane in which the first vehicle M1 is currently traveling. The result of this determination is used to determine whether the first vehicle M1 is in the wrong-way driving state.

In yet still another example, the lane in which the first vehicle M1 is currently traveling is recognized based on surroundings information (traveling situation information) and the map information. In addition, the acceleration Ax in the traveling direction (X direction) of the first vehicle M1 is calculated based on the surroundings information (traveling situation information). Furthermore, the color of the nearest traffic light in the traveling direction of the first vehicle M1 is detected or estimated based on surroundings information (traffic light recognition information). After that, based on the color of the traffic light and the depression amount of the acceleration Ax, it is determined whether the first vehicle M1 is in the red-light driving state. For example, when the acceleration Ax is on the increase even though the traffic light is a stop sign (red), it is determined that the traveling state of the first vehicle M1 is the red-light driving state.

Following step S12, the objective determination result RO is generated (step S13). The objective determination result RO is sent to the communication device 27 as the V2V information for transmission to the first vehicle M1.

2-3. Example of Processing Performed by Control System 10

Figure 8:
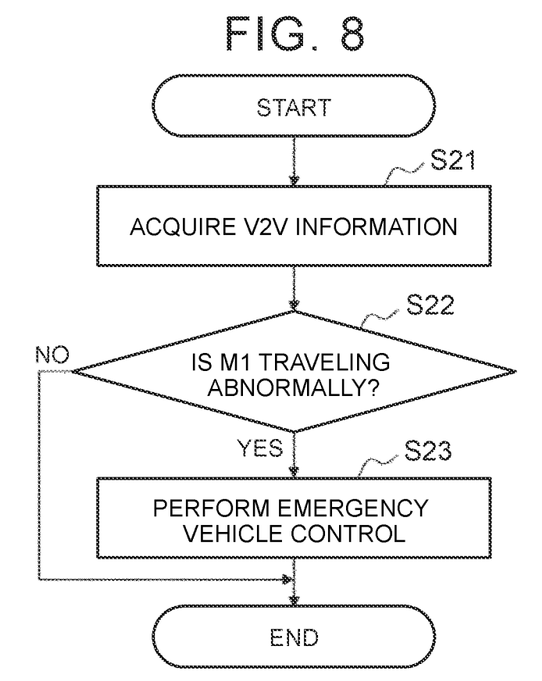
FIG. 8 is a flowchart showing the flow of a processing example performed by a control device (processor) of a first vehicle.

FIG. 8 is a flowchart showing the flow of an example of abnormal traveling determination processing performed by the control device 18 (processor 18a). The routine shown in FIG. 8 is repeatedly performed in a predetermined control cycle.

In the routine shown in FIG. 8, the V2V information is acquired first (step S21). Examples of the acquired V2V information include the ID information on each of the second vehicles M2 and the objective determination result RO determined by the second vehicle M2. The V2V information may include the traveling situation information on the second vehicle M2.

Following the processing in step S21, it is determined whether the first vehicle M1 is traveling abnormally (step S22). In the processing in step S22, the objective determination results ROs, acquired in step S21, and the total number of receptions Nro are substituted into the above expression (1) to calculate the determination index Z. When it is determined that the above expression (1) is not satisfied, the processing ends.

When it is determined in the processing in step S22 that the above expression (1) is satisfied, the emergency vehicle control is performed for the first vehicle M1 (step S23). Examples of the emergency vehicle control include the deceleration traveling control and the limp-home traveling control. When performing the emergency vehicle control, it is desirable to select either the deceleration traveling control or the limp-home traveling control according to the content of the abnormal traveling. For example, when the traveling state is the speeding state or the red-light driving state, the deceleration traveling control is selected. When the traveling state is the wrong-way driving state or the meandering driving state, the limp-home traveling control is selected. The content of the abnormal traveling is estimated based on the driving environment information on the first vehicle M1 acquired by the external sensor 11 etc. provided in the control system 10.

Figure 9:
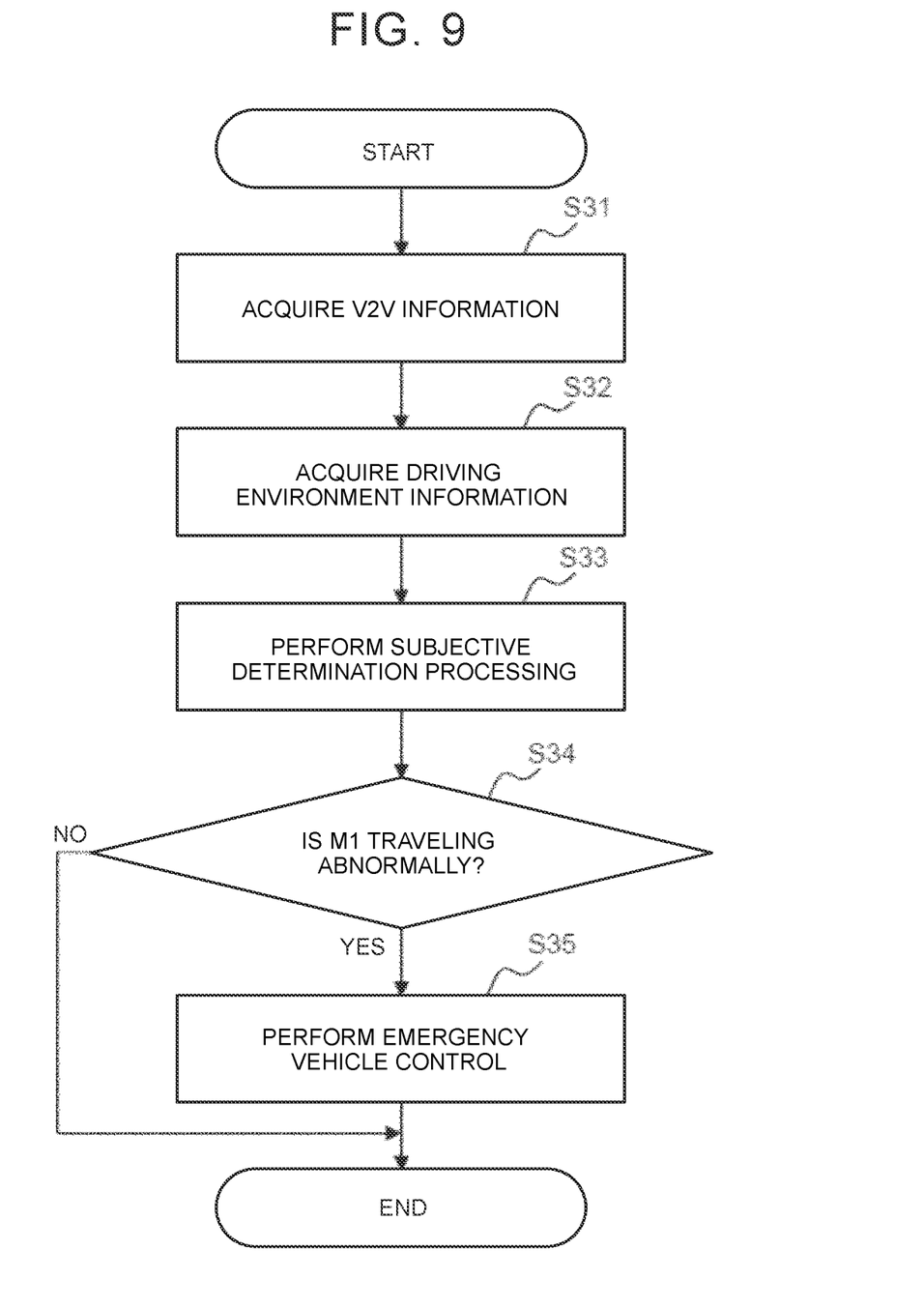
FIG. 9 is a flowchart showing the flow of another processing example performed by the control device (processor) of the first vehicle.

FIG. 9 is a flowchart showing the flow of another example of the abnormal driving determination processing performed by the control device 18 (processor 18a). The routine shown in FIG. 9 is repeatedly performed instead of the routine shown in FIG. 8 in a predetermined control cycle.

In the routine shown in FIG. 9, the V2V information is acquired first (step S31). The content of the processing performed in step S31 is the same as the content of the processing performed in step S21 described with reference to FIG. 8.

Following the processing in step S31, the driving environment information on the first vehicle M1 is acquired (step S32). This driving environment information is acquired by the external sensor 11 etc. provided in the control system 10.

Following the processing in step S32, the subjective determination processing is performed (step S33). The subjective determination processing is performed based on the driving environment information acquired in step S32. The content of the subjective determination processing is basically the same as the content of the objective determination processing.

Following the processing in step S33, it is determined whether the first vehicle M1 is traveling abnormally (step S34). In the processing in step S34, the objective determination results ROs and the total number of receptions Nro, acquired in step S31, and the result of the subjective determination processing, performed in step S33 (that is, the subjective determination result RS), are substituted into the above expression (2) to calculate the determination index Z. When it is determined that the above expression (2) is not satisfied, the processing ends.

When it is determined in the processing in step S34 that the above expression (2) is satisfied, the emergency vehicle control is performed for the first vehicle M1 (step S35). The content of the processing performed in in step S35 is the same as the content of the processing performed in step S23 described with reference to FIG. 8.

3. Effects

According to the embodiment described above, each of the control devices 28 (processor 28a) performs the objective determination processing and provides the objective determination result RO to the first vehicle M1. Then, based on this objective determination results ROs, the control device 18 (the processor 18a) determines whether the first vehicle M1 is traveling abnormally. When the control device 18 (processor 18a) performs the subjective determination processing, the control device 18 (processor 18a) determines whether the first vehicle M1 is traveling abnormally based on the subjective determination result RS and the objective determination results ROs.

When it is determined that the first vehicle M1 is traveling abnormally, the control device 18 performs emergency vehicle control for the first vehicle M1. Therefore, the embodiment gives objectivity to the abnormal traveling determination of the first vehicle M1 itself, making it possible to improve the traveling safety of the first vehicle M1.

What is claimed is:

1. A vehicle control system that uses communication between a first vehicle and a second vehicle, wherein:
the first vehicle includes a communication device configured to send and receive vehicle-to-vehicle communication information, a memory configured to store the vehicle-to-vehicle communication information, and a processor configured to perform abnormal traveling determination processing for determining whether the first vehicle is travelling abnormally;
the second vehicle includes a communication device configured to send and receive the vehicle-to-vehicle communication information, a memory configured to store the vehicle-to-vehicle communication information and driving environment information on the second vehicle, and a processor configured to perform objective determination processing for determining whether the first vehicle is traveling abnormally;
the processor of the second vehicle is configured to determine, in the objective determination processing, whether the first vehicle is traveling abnormally based on the driving environment information on the second vehicle, to generate an objective determination result as the vehicle-to-vehicle communication information to be sent to the first vehicle, and to send the objective determination result to the communication device of the second vehicle, the objective determination result indicating a determination result of the objective determination processing;
the processor of the first vehicle is configured to determine, in the abnormal traveling determination processing, whether the first vehicle is traveling abnormally based on the objective determination result and, when it is determined that the first vehicle is traveling abnormally, to perform emergency vehicle control processing for the first vehicle;
the memory of the first vehicle is configured to further store driving environment information on the first vehicle;
the abnormal traveling determination processing is configured to include subjective determination processing for subjectively determining whether the first vehicle is traveling abnormally;
the processor of the first vehicle is configured to determine, in the subjective determination processing, whether the first vehicle is traveling abnormally based on the driving environment information on the first vehicle;
the processor of the first vehicle is configured to comprehensively determine, in the abnormal traveling determination processing, whether the first vehicle is traveling abnormally based on the objective determination result and on a subjective determination result, the subjective determination result indicating a result of the subjective determination processing;
the processor of the first vehicle is configured to comprehensively determine, in the abnormal traveling determination processing, whether the first vehicle is traveling abnormally based on a calculation expression represented using the subjective determination result, the objective determination result, and weighting coefficients of the subjective determination result and the objective determination result; and
the weighting coefficients are changed based on the driving environment information on the first vehicle.

2. A vehicle control method that uses communication between a first vehicle and a second vehicle, the first vehicle includes a communication device configured to send and receive vehicle-to-vehicle communication information, a memory configured to store the vehicle-to-vehicle communication information, and a processor configured to perform abnormal traveling determination processing for determining whether the first vehicle is travelling abnormally, the second vehicle includes a communication device configured to send and receive the vehicle-to-vehicle communication information, a memory configured to store the vehicle-to-vehicle communication information and driving environment information on the second vehicle, and a processor configured to perform objective determination processing for determining whether the first vehicle is traveling abnormally, the vehicle control method comprising,
by the processor of the second vehicle, acquiring the driving environment information on the second vehicle;

performing objective determination processing for objectively determining whether the first vehicle is traveling abnormally based on the driving environment information; and generating an objective determination result as the vehicle-to-vehicle communication information to be sent to the first vehicle;

sending the objective determination result to the first vehicle, the objective determination result indicating a result of the objective determination processing; and by the processor of the first vehicle, receiving the objective determination result;

determining whether the first vehicle is traveling abnormally based on the objective determination result; and performing emergency vehicle control for the first vehicle when it is determined that the first vehicle is traveling abnormally, wherein:

the memory of the first vehicle is configured to further store driving environment information on the first vehicle;

the abnormal traveling determination processing is configured to include subjective determination processing for subjectively determining whether the first vehicle is traveling abnormally;

the processor of the first vehicle is configured to determine, in the subjective determination processing, whether the first vehicle is traveling abnormally based on the driving environment information on the first vehicle;

the processor of the first vehicle is configured to comprehensively determine, in the abnormal traveling determination processing, whether the first vehicle is traveling abnormally based on the objective determination result and on a subjective determination result, the subjective determination result indicating a result of the subjective determination processing;

the processor of the first vehicle is configured to comprehensively determine, in the abnormal traveling determination processing, whether the first vehicle is traveling abnormally based on a calculation expression represented using the subjective determination result, the objective determination result, and weighting coefficients of the subjective determination result and the objective determination result; and the weighting coefficients are changed based on the driving environment information on the first vehicle.

* * * * *